(12) United States Patent
Bucchieri et al.

(10) Patent No.: US 8,874,445 B2
(45) Date of Patent: Oct. 28, 2014

(54) APPARATUS AND METHOD FOR CONTROLLING OUTPUT FORMAT OF INFORMATION

(75) Inventors: Vittorio Bucchieri, Wakefield, MA (US); Albert L. Schmidt, Jr., Hopkinton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 2313 days.

(21) Appl. No.: 11/694,233

(22) Filed: Mar. 30, 2007

(65) Prior Publication Data

US 2008/0243513 A1 Oct. 2, 2008

(51) Int. Cl.
G10L 21/00 (2013.01)
G09B 21/00 (2006.01)

(52) U.S. Cl.
CPC ..................... *G09B 21/009* (2013.01)
USPC ........................................................ 704/270

(58) Field of Classification Search
USPC .......... 704/235, 260, 270, 270.1, 271; 379/52
See application file for complete search history.

(56) References Cited

U.S. PATENT DOCUMENTS

| 4,546,383 | A | * | 10/1985 | Abramatic et al. | 348/14.15 |
| 5,375,068 | A | * | 12/1994 | Palmer et al. | 709/204 |
| 5,953,693 | A | * | 9/1999 | Sakiyama et al. | 704/3 |
| 5,982,853 | A | * | 11/1999 | Liebermann | 379/52 |
| 6,188,429 | B1 | * | 2/2001 | Martin et al. | 348/14.08 |
| 6,477,239 | B1 | * | 11/2002 | Ohki et al. | 379/52 |
| 6,618,704 | B2 | * | 9/2003 | Kanevsky et al. | 704/271 |
| 6,760,408 | B2 | * | 7/2004 | Crosson et al. | 379/52 |
| 7,225,224 | B2 | * | 5/2007 | Nakamura | 709/204 |
| 7,277,858 | B1 | * | 10/2007 | Weaver et al. | 704/271 |
| 7,308,479 | B2 | * | 12/2007 | Ando et al. | 709/206 |
| 7,570,762 | B2 | * | 8/2009 | Kurihara et al. | 380/201 |
| 2002/0069069 | A1 | * | 6/2002 | Kanevsky et al. | 704/271 |
| 2002/0093531 | A1 | * | 7/2002 | Barile | 345/753 |
| 2003/0046101 | A1 | * | 3/2003 | Dow | 705/1 |
| 2003/0223455 | A1 | * | 12/2003 | Rashdan | 370/466 |
| 2004/0015550 | A1 | * | 1/2004 | Nakamura | 709/204 |
| 2004/0034522 | A1 | * | 2/2004 | Liebermann et al. | 704/2 |
| 2004/0103152 | A1 | * | 5/2004 | Ludwig et al. | 709/205 |
| 2005/0062844 | A1 | * | 3/2005 | Ferren et al. | 348/14.08 |
| 2006/0074624 | A1 | * | 4/2006 | Sahashi | 704/8 |
| 2006/0132607 | A1 | * | 6/2006 | Kimber et al. | 348/207.1 |
| 2006/0222015 | A1 | * | 10/2006 | Kafka et al. | 370/477 |
| 2006/0268300 | A1 | * | 11/2006 | Suzuki | 358/1.9 |
| 2006/0285652 | A1 | * | 12/2006 | McClelland et al. | 379/52 |
| 2008/0109208 | A1 | * | 5/2008 | Curry et al. | 704/3 |

OTHER PUBLICATIONS

Manoranjan et al. "Practical Low-Cost Visual Communication Using Binary Images for Deaf Sign Language", IEEE Transactions on Rehabilitation Engineering, vol. 8, No. 1, Mar. 2000.*
Schumeyer et al. "Region of Interest Priority Coding for Sign Language Videoconferencing", Proceedings of the IEEE Workshop on Multimedia Signal Processing, 1997.*

* cited by examiner

*Primary Examiner* — Jialong He (57) ABSTRACT

An apparatus for controlling the output format of information is provided. The apparatus includes a communications unit configured to receive information intended for at least one recipient. The apparatus also includes a selection unit, which is configured to automatically detect, based on the at least one recipient, an externally-specified indication of a preferred form of output selected from amongst a plurality of available forms of output. The selection unit causes the information to be outputted in the preferred form of output. A method and a computer program product are also provided for controlling the output format of information.

28 Claims, 9 Drawing Sheets

APPARATUS AND METHOD FOR CONTROLLING OUTPUT FORMAT OF INFORMATION

BACKGROUND INFORMATION

Communications media and devices serve to interconnect significant numbers of people. These media and devices are often mass manufactured, resulting in large numbers of substantially identical communications components. This strategy may provide some advantages, for example, in terms of cost. However, it does not account for the dramatic differences that can be observed in the communications styles of different persons or different communities of persons. Some aspects of communication style that can impact the use of a communications device include language preferences (e.g., English, Japanese, etc.) and preferences for visual or audible output, just to name a few.

One area where communication style can have a significant impact on the use of a communications device is within the deaf community. Current communications media and devices already address people with special needs, such as the deaf. For example, deaf users employ text telephones (also known as "teletypes" or "TTYs") and text messaging to communicate both among each other and also with persons capable of hearing. However, many deaf persons would prefer to receive content that is "signed," for example, in American Sign Language (ASL) rather than written, say, in English. Conveying signed content means relaying content using sign language, which entails the use of upper body gestures in combination with facial expressions. There is little relationship between the word sequence of an English sentence and the corresponding sign language translation, and as such, regular users of sign language would prefer to communicate using pure sign language. Unfortunately, most communications devices are not equipped to facilitate signed conversations.

One communications device that is available to deaf persons for supporting signed conversations is video phones, an example being the Sorensen Video Phone. These devices allow persons to send to one another visual images of themselves, thereby providing means for conversing in sign language. However, these devices are not typically mobile, and also tend to support only the exchange of visual information with other like devices, rather than facilitating communications with a range of devices and users.

DETAILED DESCRIPTION

Exemplary embodiments now will be described more fully hereinafter with reference to the accompanying drawings. Like numbers refer to like elements throughout.

Figure 1:
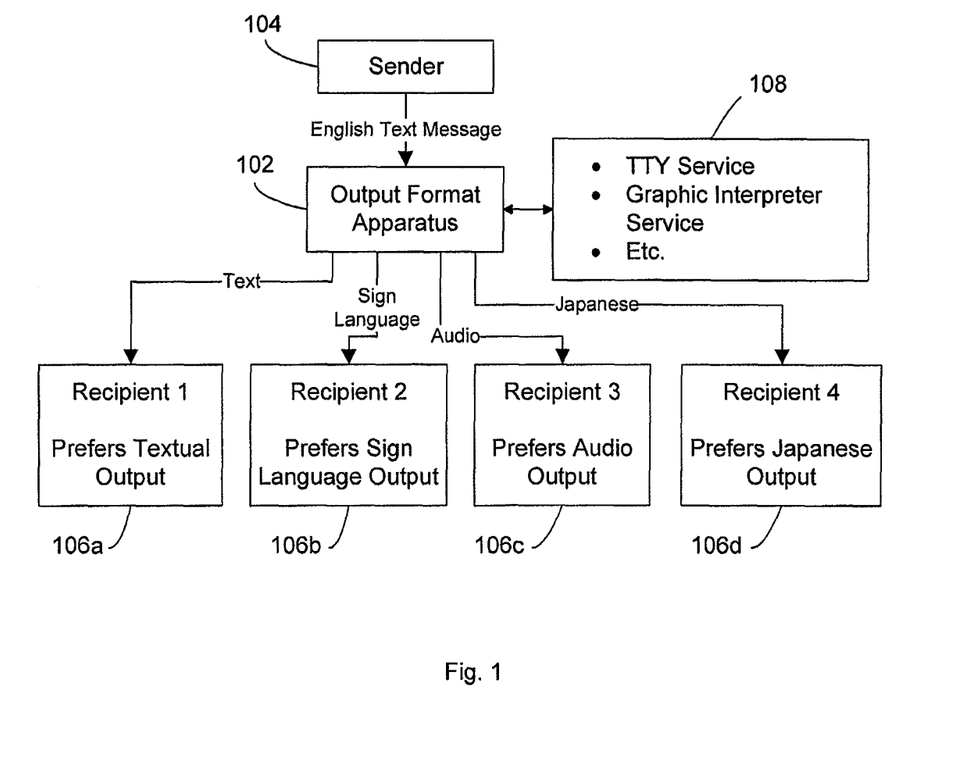
FIG. 1 is a block diagram representing a communications system configured in accordance with an exemplary embodiment, the communications system including an output format apparatus that is also configured in accordance with an exemplary embodiment.

Referring to FIG. 1, therein is shown a block diagram representing a communications system 100 configured in accordance with an exemplary embodiment, the communications system 100 including an output format apparatus 102 that is also configured in accordance with an exemplary embodiment. The output format apparatus 102 sits intermediate a sender 104 of information and one or more potential information recipients 106a-106d. Sender 104 may send information, such as a message, to any or all of recipients 106a-d, the information being in a form chosen by sender 104. For example, as illustrated in FIG. 1, sender 104 may send an English language text message for receipt by all of recipients 106a-d. Alternatively, sender 104 could send a voice message, a video of a signed message, or some other data form.

The information sent by sender 104 is received by output format apparatus 102, the received information including or being accompanied by identification of the intended recipients 106a-d. Output format apparatus 102 may then detect, for each intended recipient 106a-d, a respective indication of a preferred form of output selected from amongst a plurality of available forms of output. The available forms of output may include, for example, signed information via video, textual information via text messages, and/or verbal information via audio output. In order to detect the indications of the preferred forms of output, output format apparatus 102 may locally maintain a database associating each of the potential information recipients 106a-d with a respective indication of a preferred form of output that may, for example, have been initially provided by the recipients themselves. Alternatively, the various indications of the preferred forms of output may be externally-specified, with output format apparatus 102 possibly initiating communication with each intended recipient 106a-d, or representatives thereof, and detecting and/or obtaining the indications of the preferred forms of output. As another example, output format apparatus 102 may detect that an intended recipient is only capable of receiving one or a few types of output which may accordingly serve as the indication of a preferred form of output.

Once output format apparatus 102 has determined the preferred forms of output, output format apparatus 102 may then cause the information received from sender 104 in one form (e.g., as an English text message) to be selectively outputted in a variety of representative forms, even simultaneously, to any or all of recipients 106a-d, with each recipient receiving the information in the respective form of output that is respectively indicated by that recipient. For example, as shown in FIG. 1, a first recipient 106a may receive the message as text, a second recipient 106b may receive the message as sign language, a third recipient 106c may receive the message as audio, and a fourth recipient 106d may receive the message in Japanese.

Output format apparatus 102 may cause the representative forms of the information to be generated and outputted to recipients 106a-d via any of a variety of procedures, such as via various translation procedures. For example, output format apparatus 102 may itself generate the necessary representations of the information as specified by the indications of preferred forms of output. These representations can then be transmitted to recipients 106a-d, either directly by output format apparatus 102 or via an intermediary, such as, for example, an Internet service provider. Alternatively, output format apparatus 102 may direct a separate entity and/or device to produce the necessary output forms. Such separate entities and/or devices may include a translation service, such as a text telephone service ("TTY service") and/or a Graphic Interpretation Service/sign language translation service; various general purpose computers executing translation software for transforming messages between languages, between text and audio, etc.; and the like. Once the separate entity and/or device has produced the necessary representations of the information, these representations can either be transmitted directly to recipients 106a-d or can be transferred back to output format apparatus 102 for subsequent distribution.

Figure 2:
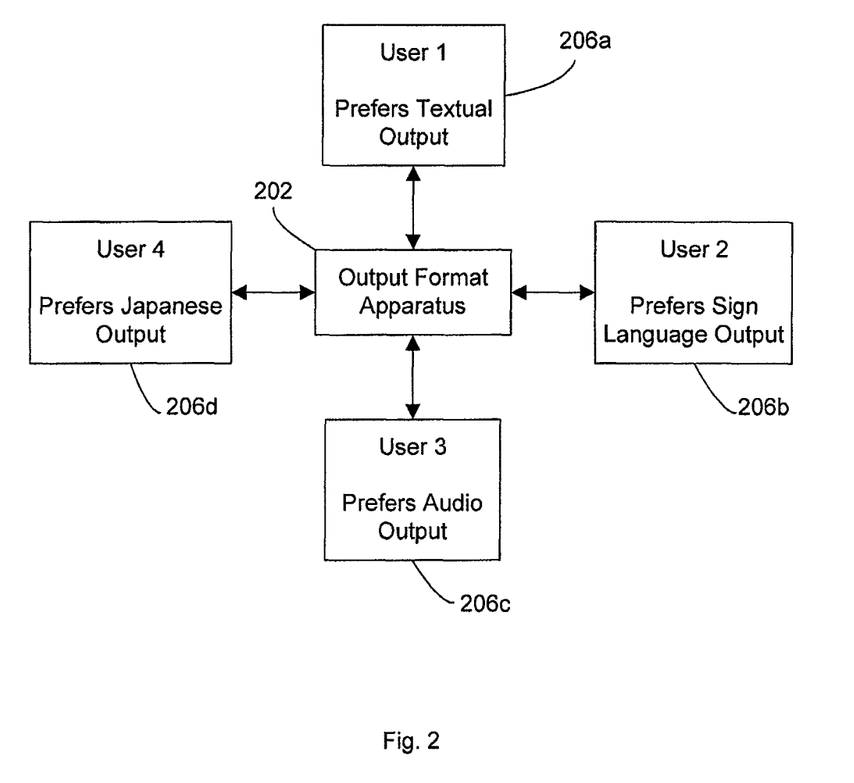
FIG. 2 is a block diagram representing a communications system configured in accordance with another exemplary embodiment, highlighting the two-way communications capability of the embodiment.

The above discussion has described an exemplary embodiment of communications system 100 as including a sender 104 that sends information and one or more recipients 106a-d that receive the information. However, it should be understood that this and other embodiments can be configured to support two-way communications, such that a user of communications system 100 may act as a sender in one instance and as a recipient in another instance. As such, FIG. 1 represents communications system 100 as seen during one of several possible modes of information distribution operation. By contrast, referring to FIG. 2, therein is shown an exemplary embodiment illustrated to highlight the two-way communications capability of the embodiment. In this embodiment, each user 206a-d may communicate information to any of the other users in a preferred output form via output format apparatus 202. It is to be understood throughout that references to a "sender" and/or a "recipient" are not meant to indicate that the described embodiment is limited to unilateral communications.

Figure 3:
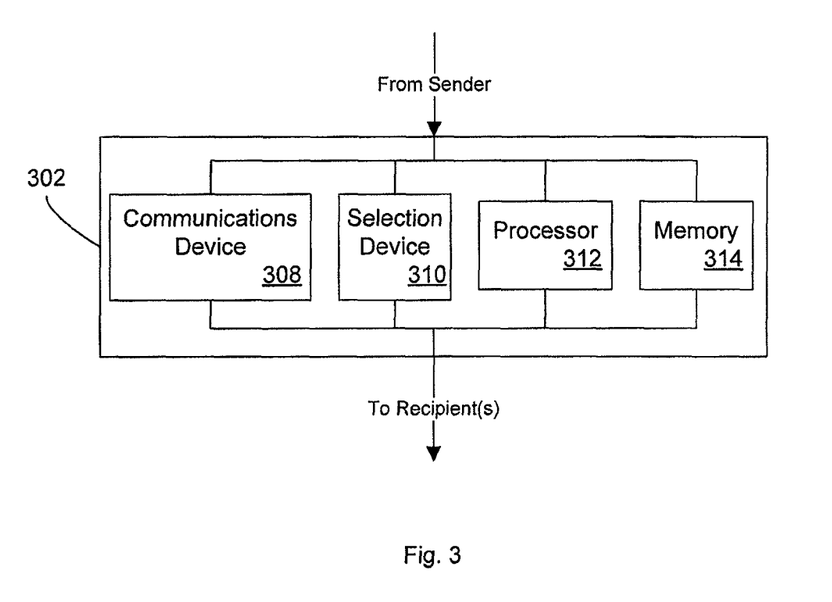
FIG. 3 is a block diagram representing an output format apparatus configured in accordance with an exemplary embodiment.

Referring to FIG. 3, therein is shown an output format apparatus 302 configured in accordance with an exemplary embodiment. Output format apparatus 302 may include a communications unit 308 configured to receive information, the content of which will eventually be transmitted to one or more recipients. Along these lines, communications unit 308 may include, for example, a network connection, such as a wireless network connection, a transceiver, and/or an Internet connection, and may include one or more input ports for communicating with a data device, such as a personal computer or a personal digital assistant (PDA). Communications unit 308 may be configured to receive information in a variety of forms, including, for example, video files including signed information, data files including text information, and audio files including verbal information, and via a variety of networks and/or sources. Communications unit 308 may also include one or more user input devices and/or data acquisition devices, such as a keyboard, keypad, microphone, and/or video recording device, such that data might be entered and/or collected at output format apparatus 302.

Output format apparatus 302 may also include a selection unit 310 in communication with communications unit 308, selection unit 310 being responsible for detecting indications of the forms of output preferred by information recipients and for causing the information to be outputted in the preferred form. In detecting indications of preferred output form, selection unit 310 may utilize a communication mechanism (e.g., a network connection) configured to receive from one or more recipients associated indications of preferred output form. Such communication mechanism may be integrated into selection unit 310, or selection unit 310 may interact with communications unit 308. In directing information output, selection unit 310 may work in conjunction with a processor 312 that may or may not be integrated with selection unit 310. Processor 312 may include firmware and/or a programmable processor that executes instructions stored on a memory 314. Memory 314 may also store indications of a preferred form of output, perhaps within a database associating each of the potential recipients of information or personal "Contacts" with a respective indication of a preferred form of output, as well as the information received by communications unit 308.

Processor 312 and/or selection unit 310 may be configured to provide for an output representation of received information in a variety of forms, including, for example, sign language, audio, and text. This variety of forms may be provided directly by output format apparatus 302, for example, being automatically generated by processor 312 in response to direction from selection unit 310 regarding preferred forms of output. For example, processor 312 may execute translation software for transforming messages between languages (e.g., back and forth between sign language and a non-signed language or between English and Japanese), between text and audio, etc. An example of a system that automatically translates from text to a sign language representation of the text is provided in U.S. patent application Ser. No. 11/453,202, filed Jun. 15, 2006, entitled Methods and Systems for a Sign Language Graphical Interpreter, which is hereby incorporated by reference in its entirety. Of course, in some instances, the preferred form of output will coincide with the form in which the original message was received, in which case processor 312 may simply forward the message as it was received or with modifications related to facilitating transmission, such as data compression or format modification. Such compression and/or modification of a file to be transmitted may be selected by a user of output format apparatus 302 or by a sender of the file. For example, a user may indicate via a user input device that either the audio component or the visual component of a video should be excluded before the video is transmitted.

Processor 312 and/or selection unit 310 may alternatively be configured to facilitate communication with separate entities (e.g., TTY service provider) to enlist their services in providing the necessary output format. For example, selection unit 310 may determine a preferred translation service selected from a plurality of translation services based on the indication of the preferred form of output, and may then cause the original content and form of a message to be transmitted to the preferred translation service (possibly along with instructions regarding a desired output format, although in some cases this may be understood based on the identity of the chosen service provider). The translation service could then transmit back to output format apparatus 302 the message represented in the preferred form of output. Such communication to and from a service provider can be facilitated, for example, via communications unit 308.

Figure 4:
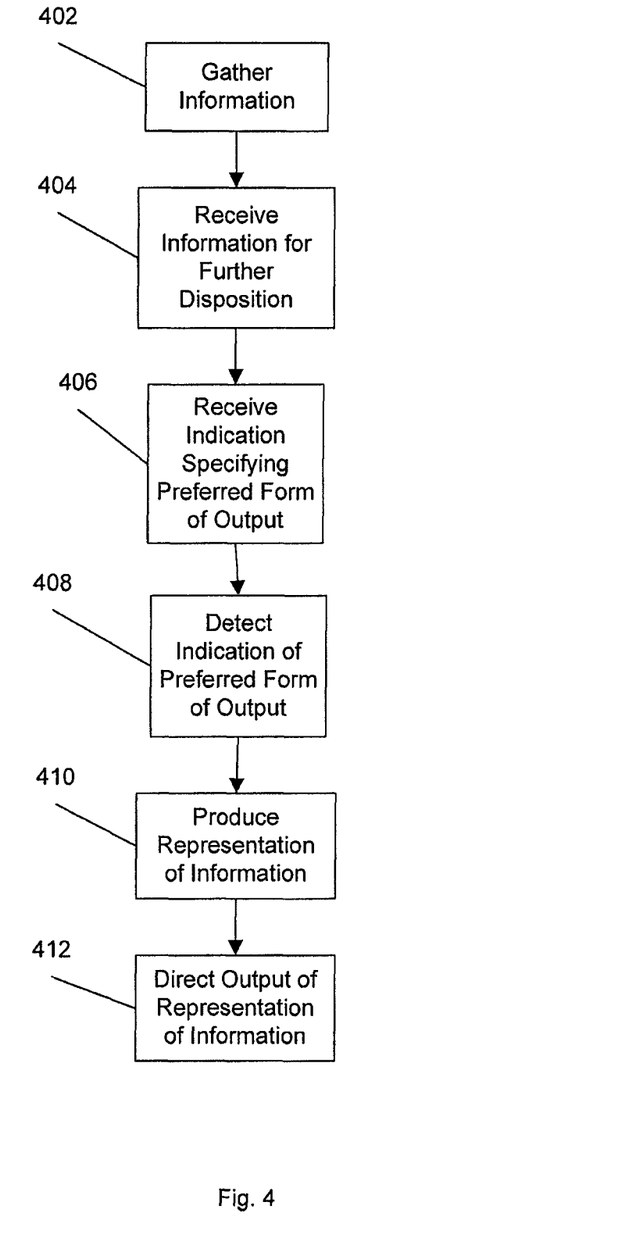
FIG. 4 is a flow chart representing a communications method consistent with another exemplary embodiment.

Referring to FIG. 4, therein is shown a flow chart representing a communications method 400 consistent with another exemplary embodiment. Method 400 may be carried out, for example, in conjunction with an output format apparatus similar to that shown in FIG. 3. The method includes, at Block 402, gathering information for subsequent transmission to a recipient. For example, information may be entered as text using a keypad associated with a cellular telephone, or may be recorded as video using a video recording device incorporated into a cellular telephone.

At Block 404, the collected information is received for further disposition. For example, the information may be received by an intermediary located separately from the point from which the information was collected (e.g., as in the case where the information is collected by a cellular telephone and then transmitted via a wireless network to an output format apparatus) or the information may be transferred to a component collocated with the point of information collection (as in the case where output format apparatus is integrated with a cellular telephone from which a message is being sent). The received information may be in any of a variety of forms, such as a video file including signed information, a data file including text information, and/or an audio file including verbal information.

An indication may be received at Block 406 specifying a preferred form of output for the information. This preferred form of output may be selected from amongst a plurality of available forms of output, including, for example, video for signed information, textual for text information, and audio for verbal information. The indication may be externally-specified, and may be received from at least one recipient of the information and possibly stored for subsequent use. The indication of the preferred form of output is detected at Block 408.

At Block 410, a representation of the information is produced in a form consistent with the indication of the preferred form of output. This representation may be automatically produced, such as by a computer executing appropriate software. Alternatively, the representation of the information may be produced by selecting a translation service from a plurality of available translation services based on the indication of the preferred form of output and then communicating the information to the selected translation service. Examples of translation services that may be utilized include TTY services and a sign language translation services. Regardless of the method by which the representation of the information is generated, at Block 412, the information is directed to be outputted in the preferred form of output. For example, the information may be outputted via a wireless network to at least a recipient mobile terminal.

Figure 5A:
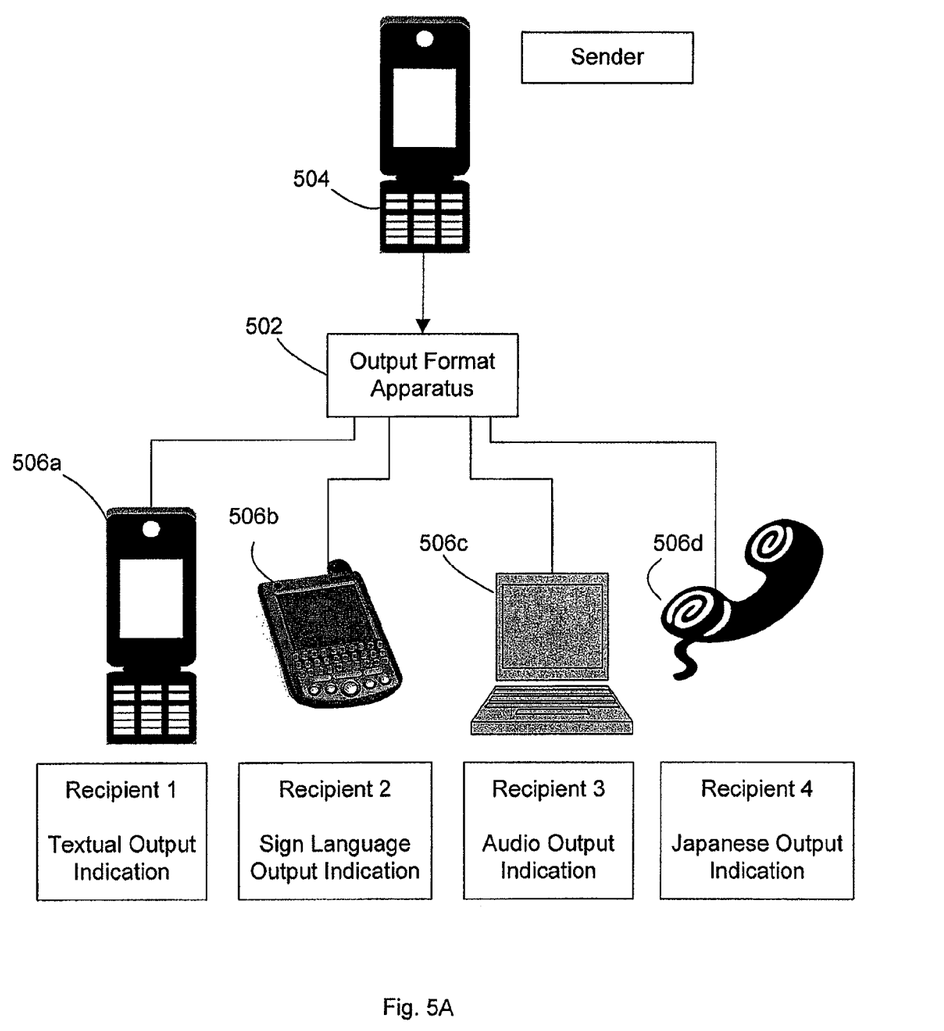
FIGS. 5A-5C are schematic illustrations of a communications system configured in accordance with another exemplary embodiment, the figures demonstrating operation of the system.

Referring to FIG. 5A, therein is shown a communications system 500 configured in accordance with another exemplary embodiment. The communications system 500 may include at least one sending communications device, such as cellular telephone 504, and one or more receiving communications devices 506, such as a mobile terminal (e.g., cellular telephone 506a, PDA 506b, mobile computer 506c, etc.), a computer, and/or a telephone 506d. Sending communications device 504 and receiving communications devices 506 may include communications units, such as network connections and/or transceivers, and may communicate with one another in various ways, including through output format apparatus 502. For clarity of explanation, cellular telephone 506a is associated with "Recipient 1," PDA 506b is associated with "Recipient 2," mobile computer 506c is associated with "Recipient 3," and telephone 506d is associated with "Recipient 4," while sending communications device 504 is associated with "Sender."

Sending communications device 504 may be configured to collect or allow input of various types of data, such as video, audio, and/or textual. As such, sending communications device 504 may include a keypad or keyboard, a microphone, and/or a video recording device. At least some of the receiving communications devices 506 may be configured to receive and output one or more of various types of information, including video data, audio data, and/or textual data. For example, cellular telephone 506a, PDA 506b, and portable computer 506c may include a display device, such as an LCD screen, and an audio speaker, as well as an input device, such as a keypad or keyboard. Alternatively, some receiving communications devices, such as telephone 506d, may be limited to outputting fewer types of data. Each receiving communications device 506a-d may specify a preferred form of output, as shown in FIG. 5A.

Figure 5B:
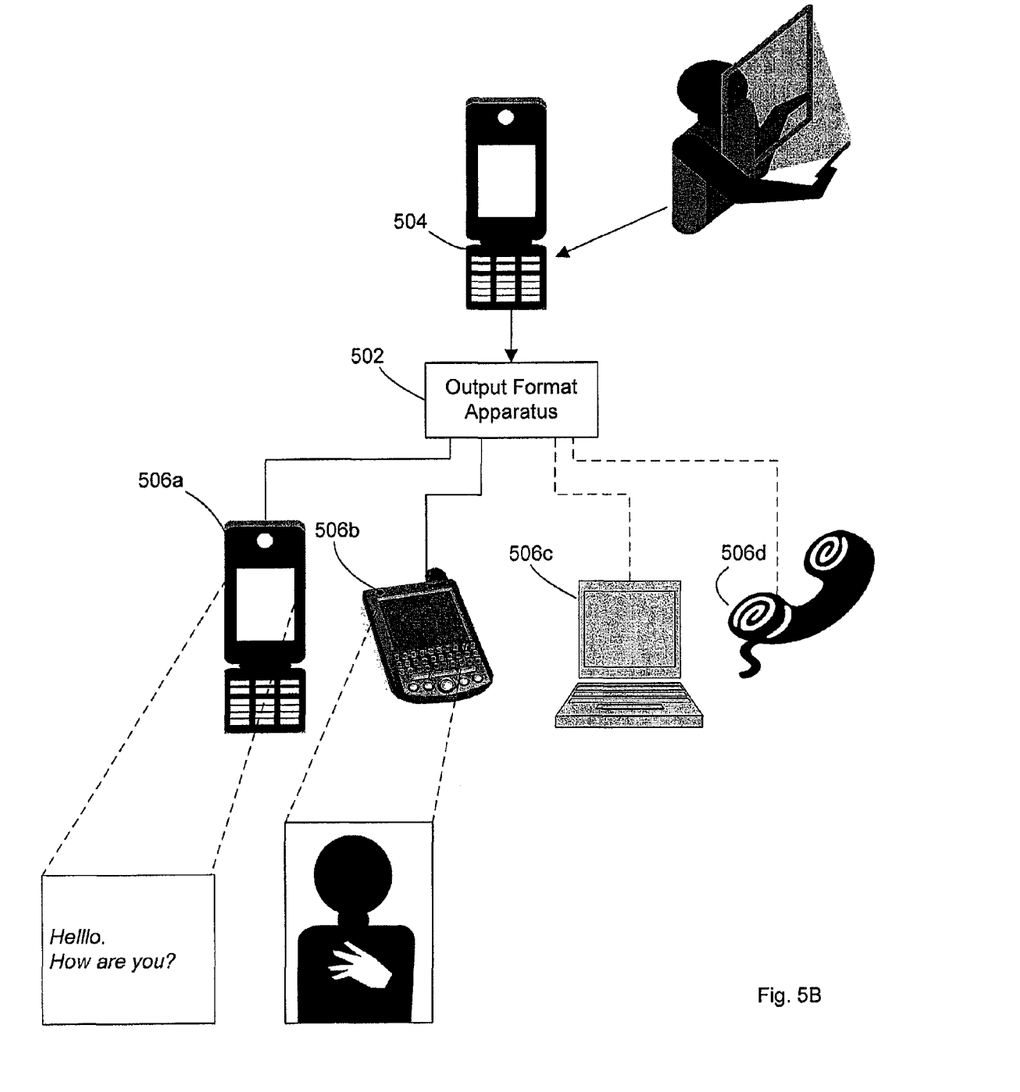
Figure 5C:
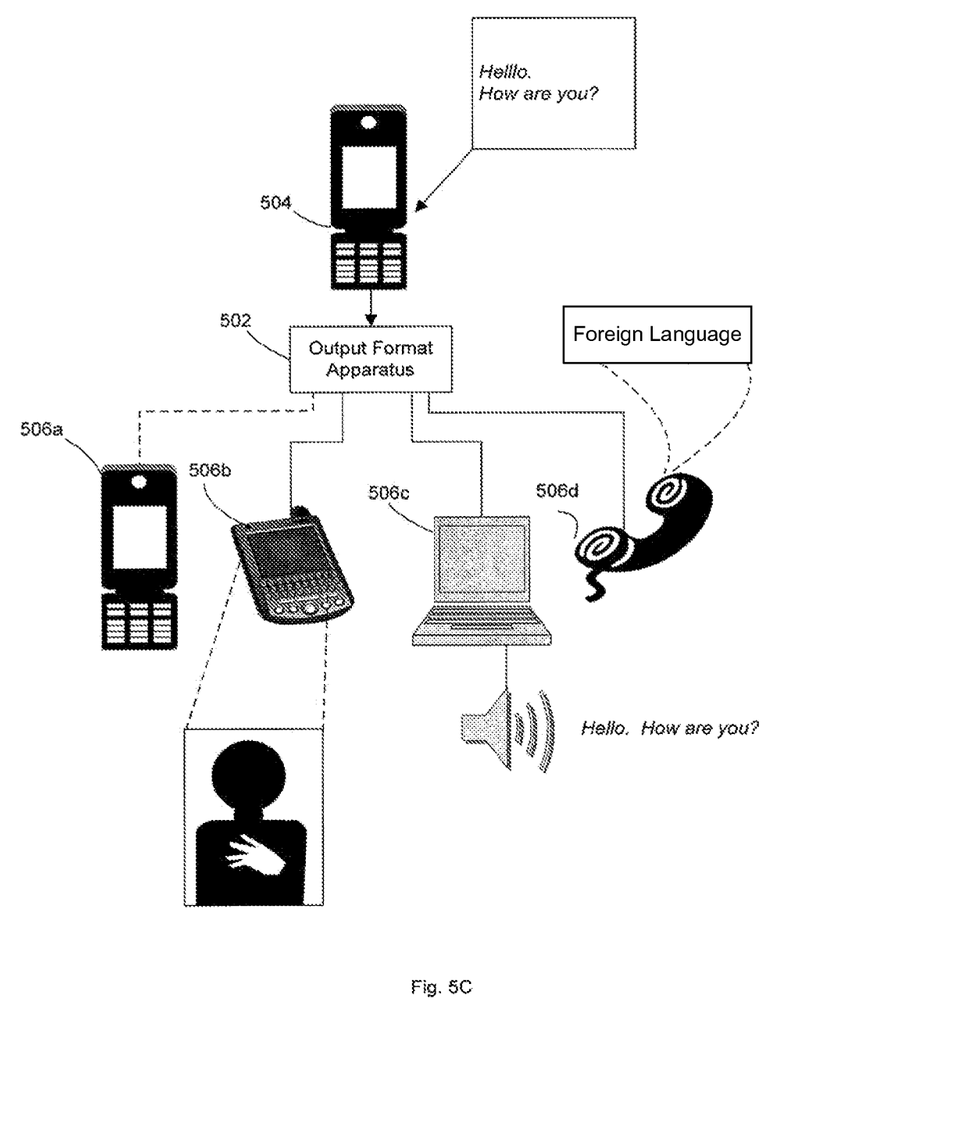

Referring to FIGS. 5B-5C, therein is schematically illustrated the operation of the communications system 500 as it performs several communications processes. First in FIG. 5B, Sender may use a video recording device incorporated into sending communications device 504 to record a video of a signed message. This signed message may then be addressed and transmitted as video to, say, Recipient 1 and Recipient 2 via output format apparatus 502. Output format apparatus 502 may then detect the forms of output preferred by Recipient 1 and Recipient 2, and may generate (or have generated, as discussed above) the appropriate representations of the original message from Sender. In the illustrated case, Recipient 1 and Recipient 2 have specified preferences for textual output and sign language output, respectively, and these output formats are delivered (or caused to be delivered) to Recipient 1 and Recipient 2. It is noted that when distributing a video output, output format apparatus 502 may compress or reduce the information included in the message to that which is critical to comprehending the signed message, in order to facilitate transmission and reduce latency. For example, a processor of output format apparatus 502 may be configured to take a received sign language video and automatically produce a video representation that excludes audio data and employs reduced quality images.

Now referring to FIG. 5C, Sender may use a keypad incorporated into sending communications device 504 to enter a text message. This text message may then be addressed and transmitted via output format apparatus 502 to, say, Recipient 2, Recipient 3, and Recipient 4. Output format apparatus 502 may then detect the forms of output preferred by Recipient 2, Recipient 3, and Recipient 4, and may generate (or have generated, as discussed above) the appropriate representations of the original message from Sender. In the illustrated case, Recipient 2 has specified a preference for sign language output, Recipient 3 has specified a preference for audio output, and Recipient 4 has specified a preference for output in Japanese, and these output formats are delivered (or caused to be delivered) to Recipient 2, Recipient 3, and Recipient 4.

Figure 6A:
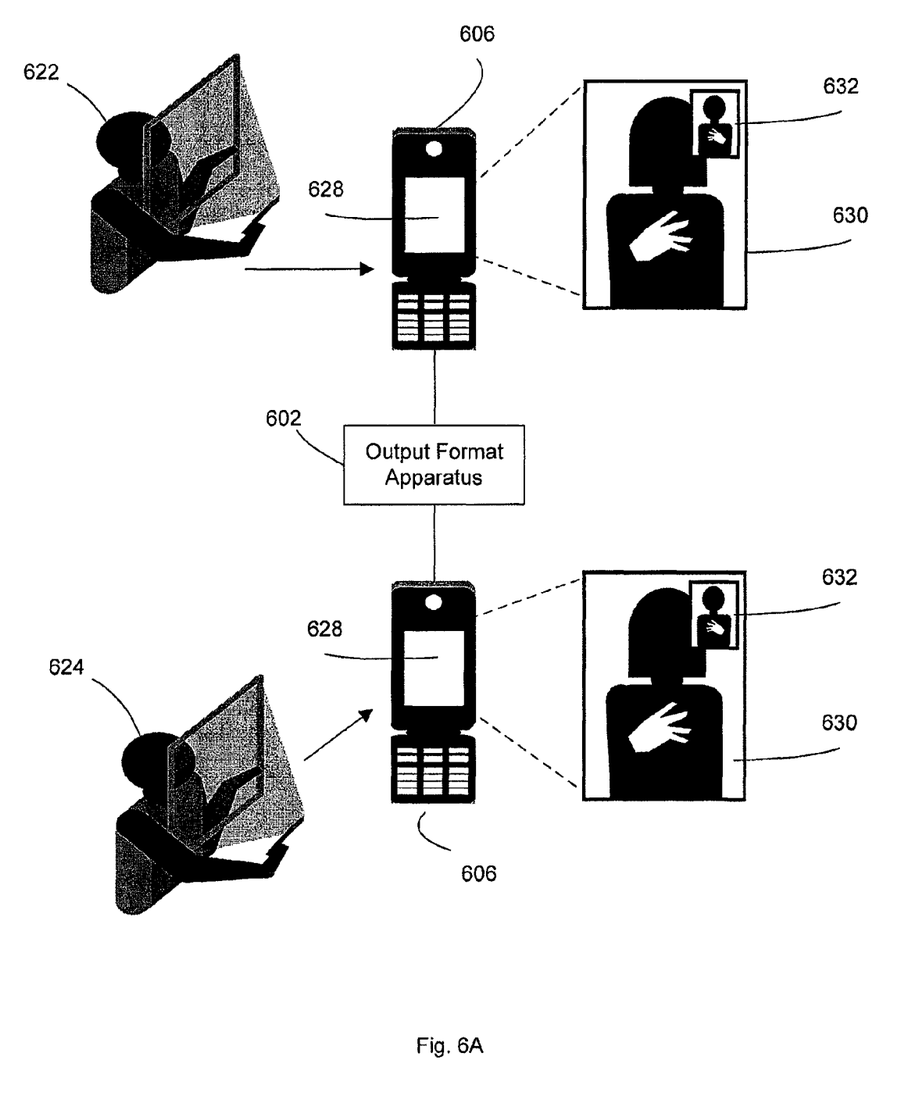
FIGS. 6A and 6B are schematic illustrations of exemplary embodiments of a communication systems configured in accordance with yet further exemplary embodiments, the figures highlighting several of the possible outputs that may be used in conjunction with the system.
Figure 6B:
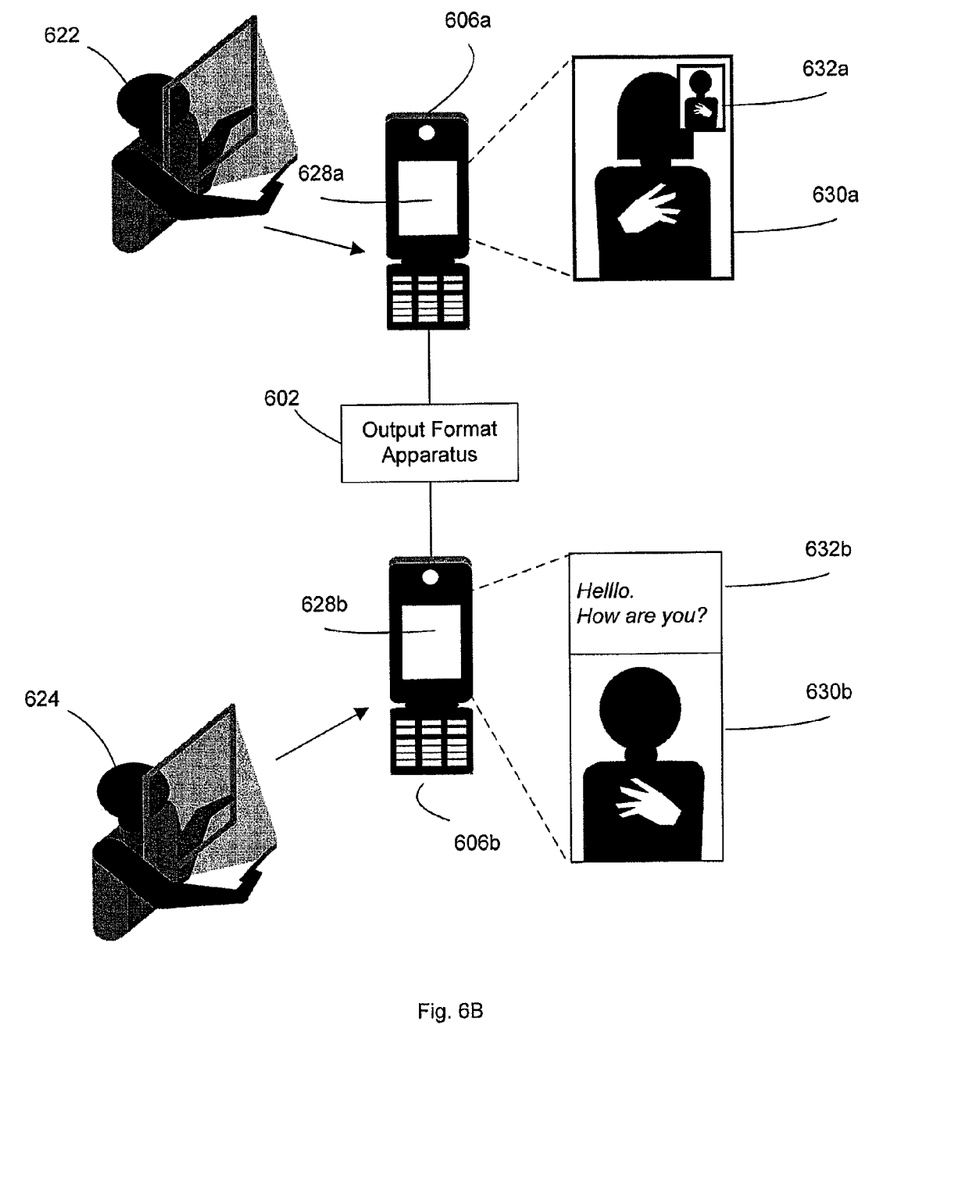

Referring to FIGS. 6A and 6B, therein are schematically shown several exemplary embodiments of communication systems 600a-b including embodiments of output format apparatuses 602a-b similar to those described previously. The output format apparatuses 602a-b, as in previous embodiments, serve to receive information or a message in one form and to forward the message in a variety of forms that may or may not include the original form. The figures highlight several of the possible outputs that may be used in conjunction with such a system. Generally, the outputs directed by the processor of the output format apparatuses include two portions, with one portion representing the information communicated by the user of the device providing the output and the other portion representing the information being received by the user from another. That is, the output portions provide separate representations of either side of a bilateral conversation.

As an example, in FIG. 6A, users 622, 624 are communicating using respective cellular telephones 606. Each cellular telephone 606 includes a display 628 having a first display portion 630 and a second display portion 632. As shown, each user 622, 624 is communicating using sign language (e.g., using a video recording device incorporated into the cellular telephones), and it is additionally true that both users 622, 624 have specified a preference for receiving a sign language output. As such, first display portion 630 is driven by the processor to show information, in this case a visual representation of the physical movements, received from another user and second display portion 632 is driven by the processor to show the information (again, the physical movements) being generated and transmitted by the local user.

Referring to FIG. 6B, first and second users 622, 624 are again communicating, using respective first and second cellular telephones 606a, 606b. First cellular telephone 606a includes a display 628a having a first display portion 630a and a second display portion 632a. Similarly, second cellular telephone 606b includes a display 628b having a first display portion 630b and a second display portion 632b. The first user 622 is communicating using sign language (e.g., using a video recording device incorporated into the cellular telephones), while the second user 624 is communicating using text messages. However, both users 622, 624 have specified a preference for receiving a sign language output. As such, first display portion 630a associated with first cellular telephone 606a is driven by the processor to show a visual representation of the signed information being received from second user 624, while the second display portion 632a is driven by the processor to display the signing of first user 622. Looking at the output provided by the respective processor at second cellular telephone 606b, first display portion 630b shows a textual representation of the signed information being received from first user 622, while the second display portion 632a displays the signing of second user 622.

Many of the previously described embodiments have shown the output format apparatus as being separate from, and intermediate to, both a sender of information and a receiver of information. However, some embodiments of the output format apparatus may be integrated with a sending communications device, with a receiving communications device, or with both. For example, in one embodiment, an output format apparatus is integrated with a receiving communications device, such as a mobile terminal having an audio output device (e.g., an audio speaker) and a visual output device (e.g., an LCD screen). The output format apparatus may include a communications unit and a selection unit, and the mobile terminal might then connect to and receive information from a network, via the communications unit, and cause the information to be outputted as appropriate from either the audio output device or the visual output device based on the detected indication of the preferred form of output.

As another example, the output format apparatus may be integrated at the sending end of a communication, for example, being incorporated into a mobile terminal. The mobile terminal may include one or more user input devices, such as a keyboard, a keypad, and/or video recording device, via which the user may generate some or all of the information for transmission to a receiver (i.e., the user input devices are included with a communications unit of the mobile terminal). The sender's mobile terminal may then receive the information input by the sender and locally convert the message to the required form before it is transmitted elsewhere.

FIG. 4 is a flowchart of a system, method and program product according to exemplary embodiments of the invention. It will be understood that each block or step of the flowchart, and combinations of blocks in the flowchart, can be implemented by various means, such as hardware, firmware, and/or software including one or more computer program instructions. In this regard, the computer program instructions which embody the procedures described above may be stored by a memory device of a computing device, such as the control server or the portals, and executed by a built-in processor of the computing device. As will be appreciated, any such computer program instructions may be loaded onto a computer or other programmable apparatus (i.e., hardware) to produce a machine, such that the instructions which execute on the computer or other programmable apparatus create means for implementing the functions specified in the flowcharts block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowcharts block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowcharts block(s) or step(s).

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowcharts, can be implemented by special purpose hardware-based computer systems which perform the specified functions or steps, or combinations of special purpose hardware and computer instructions.

In the preceding specification, various embodiments of the claimed invention have been described. It will, however, be evident that various modifications and changes may be made thereunto without departing from the broader spirit and scope of the invention as set forth in the claims that follow. For example, each user may be associated with several preferred forms of output. These multiple preferred forms of output may be ordered in terms of preference, such that a second preferred form may be utilized if a first preferred form is unavailable, or the preferred forms may be specifically chosen depending on the device being used to receive the information (e.g., text is preferred, but where receiving device is a telephone lacking a visual display, audio is an acceptable alternative). In some embodiments, users may access an output format apparatus to determine the available forms of output. In other embodiments, an output format apparatus need not be associated with either a sender or a receiver, but rather could act as a server that stores information and supplies that information, on request, in a requested format. In still other embodiments, an output format apparatus may facilitate communication of multimedia messages, providing translations of the communicative portions of the message without affecting other portions (perhaps identified by file type or format). In yet other embodiments, "recipients" of messages may be automated systems, such as electronic or voice mail boxes, to which messages are delivered in a preferred form. Such recorded messages could be stored and subsequently subjected to a detailed review, with playback of the recording being possible in slow motion, in fast forward, and with indexing. Therefore, the specification and drawings are accordingly to be regarded in an illustrative rather than restrictive sense.

That which is claimed:

1. An apparatus comprising:
   a communications device to receive information intended for at least one recipient, the information including audio data and video data; and
   a selection device to automatically detect, based on the at least one recipient, an externally-specified indication of a preferred form of output selected from amongst a plurality of available forms of output and to cause the information to be outputted in the preferred form of output, where causing the information to be outputted in the preferred form of output includes:
      outputting a sign language video representation of the information, that excludes the audio data and has reduced quality images, in response to the preferred form of output indicating a preference for sign language video representation.

2. An apparatus as recited in claim 1, where said selection device is to receive the indication of a preferred form of output from at least one recipient of the information.

3. An apparatus as recited in claim 2, where the at least one recipient of the information includes a mobile terminal having an audio output device and a visual output device and where the mobile terminal also comprises said communications device and said selection device, said communications device to connect to and receive the information from a network and said selection device to cause the information to be outputted via the visual output device based on the detected indication of the preferred form of output.

4. An apparatus as recited in claim 3, where said communications device further includes a user input device for inputting at least some of the information.

5. An apparatus as recited in claim 4, where said user input device includes a video recording device.

6. An apparatus as recited in claim 1, where the plurality of available forms of output includes video for signed information, textual for text information, and audio for verbal information.

7. An apparatus as recited in claim 1, where said communications device is to receive information in a form selected from the group including: a video file including signed information, a data file including text information, and an audio file including verbal information.

8. An apparatus as recited in claim 1, further comprising a processor to detect the indication of the preferred form of output and to automatically produce a representation of the information in a form consistent with the indication of the preferred form of output.

9. An apparatus as recited in claim 8, where said processor is to automatically produce a sign language video representation of the information in response to the indication of the preferred form of output indicating a preference for sign language video representation.

10. An apparatus as recited in claim 9, where said processor is to automatically transmit the sign language video representation so as to exclude the audio data and to employ the reduced quality images.

11. An apparatus as recited in claim 1, where said selection device is to cause the information to be communicated to a preferred translation service selected from a plurality of translation services based on the indication of the preferred form of output.

12. An apparatus as recited in claim 11, where the plurality of translation services includes a sign language translation service.

13. An apparatus as recited in claim 1, where said selection device is to detect the indication of the preferred form of output respectively specified by each of a plurality of recipients and to cause the information to be outputted substantially simultaneously to each of the plurality of recipients in the respectively specified preferred form of output.

14. An apparatus as recited in claim 1, further comprising a memory to store the information received by said communications device.

15. An apparatus as recited in claim 14, where said memory is further to store the indication of the preferred form of output.

16. A method, performed by a processor, the method comprising:
   receiving, by the processor, information intended for at least one recipient;
   automatically detecting, by the processor and based on the at least one recipient, an externally-specified indication of a preferred form of output selected from amongst a plurality of available forms of output;
   automatically producing, by the processor, a representation of the information in a form consistent with the indication of the preferred form of output, where automatically producing the representation includes automatically producing a sign language video representation of the information that excludes audio data and has reduced quality images in response to the preferred output indication indicating a preference for sign language video representation; and
   directing, by the processor, output of the information in the preferred form of output.

17. A method as recited in claim 16, where said detecting the externally-specified indication of the preferred form of output includes detecting the externally-specified indication of the preferred form of output from amongst output forms selected from the group including video for signed information, textual for text information, and audio for verbal information.

18. A method as recited in claim 16, where said receiving information includes receiving information in at least one form selected from the group including: a video file including signed information, a data file including text information, and an audio file including verbal information.

19. A method as recited in claim 16, where said receiving information includes receiving information via a wireless network from a first mobile terminal and where causing the information to be outputted includes causing the information to be outputted via a wireless network to at least a second mobile terminal.

20. A method as recited in claim 16, further comprising receiving the indication of the preferred form of output from the at least one recipient of the information.

21. A method as recited in claim 16, further comprising:
   selecting a translation service from a plurality of available translation services based on the indication of the preferred form of output, and
   communicating the information to the selected translation service.

22. A method as recited in claim 21, where said selecting a translation service includes selecting a translation service from the group of translation services including a text telephone service and a sign language translation service.

23. A method as recited in claim 16, further comprising storing the indication of the preferred form of output.

24. An apparatus comprising:
   a communications unit to transmit information via a wireless network;
   a data acquisition device to acquire input data including audio component data and visual component data;

a user input device; and a processing device to cause only the visual component data to be transmitted by said communications unit as output data based on an indication received from said user input device, where the visual component data has reduced quality images.

25. An apparatus according to claim 24, further comprising a selection unit in communication with said communications unit and said processing device, the selection unit to detect an externally-specified indication of a preferred form of output selected from amongst a plurality of available forms of output, and where said processing device is to selectively cause only the visual component data to be transmitted by said communications unit as output data based on the externally-specified indication of a preferred form of output and to cause the information to be outputted in the preferred form of output.

26. An apparatus comprising:

a communications unit to receive information, the information including audio data and visual data;

a selection unit to automatically detect an indication of a preferred form of output selected from amongst a plurality of available forms of output and to cause the information to be outputted in the preferred form of output, where causing the information to be outputted in the preferred form of output includes:

outputting a sign language video representation of the information, that excludes the audio data and has reduced quality images, in response to the preferred form of output being sign language video representation.

27. An apparatus as recited in claim 26, where said selection unit is to receive the indication of a preferred form of output from at least one recipient of the information.

28. An apparatus as recited in claim 26, further comprising a processor to detect the indication of the preferred form of output and to automatically produce a representation of the information in a form consistent with the indication of the preferred form of output.

* * * * *